United States Patent [19]

Blass

[11] 4,156,232

[45] May 22, 1979

[54] SINGLE WIRE LIGHT CONTROL SYSTEM

[75] Inventor: David A. Blass, River Grove, Ill.

[73] Assignee: Aeroflash Signal Corporation, Chicago, Ill.

[21] Appl. No.: 820,770

[22] Filed: Aug. 1, 1977

[51] Int. Cl.[2] .................. H04Q 9/00; H04Q 11/04; G08C 15/12

[52] U.S. Cl. .................. 340/168 R; 307/10 LS; 340/52 F; 340/147 SY; 340/74

[58] Field of Search .......... 340/147 R, 168 R, 168 B, 340/52 F, 147 SY, 168 S, 74; 307/10 LS, 10 R

[56] References Cited

U.S. PATENT DOCUMENTS

| | | | |
|---|---|---|---|
| 3,544,803 | 12/1970 | Taylor | 340/168 R |
| 3,651,454 | 3/1972 | Venema et al. | 340/52 F |
| 3,680,050 | 7/1972 | Griffin | 340/168 S |
| 3,846,639 | 11/1974 | Ueda et al. | 340/52 F |
| 3,864,578 | 2/1975 | Lackey | 340/168 B |
| 3,943,489 | 3/1976 | Brewster et al. | 340/147 SY |
| 3,944,981 | 3/1976 | Akita et al. | 340/147 R |

*Primary Examiner*—Donald J. Yusko
*Attorney, Agent, or Firm*—Michael G. Berkman

[57] ABSTRACT

A single-wire system for controlling electrical devices and multiple lights such as warning and signal lights for buses and other vehicles. The system includes a transmitter at a forward end of the vehicle and a receiver at the rear, a power supply and a signal lead. The transmitter operates in a "parallel in"-"serial out" mode and converts simultaneously-received input signals into a sequential or serial output format for transmission, on a single wire, to a "serial-in"-"parallel-out" receiver where the signals are decoded to provide rapid-pulse command data. These data bits are then directed to appropriate stations, including lamps, for energization thereof as warning and signal elements.

4 Claims, 11 Drawing Figures

SIGNAL LINE
NAND GATES
DIODES
BACKUP LIGHT INPUT
RUNNING LIGHT INPUT
STOP LIGHT INPUT
DOOR SWITCH TERMINAL
START SWITCH TERMINAL
NON LATCHING "ON" TERMINAL
RIGHT TURN SIGNAL
LEFT TURN SIGNAL
LAMP DRIVER CIRCUITS
RED LAMP
AMBER LAMP
AMBER LAMP
RED LAMP
TURN SIGNAL
TURN SIGNAL

SINGLE WIRE LIGHT CONTROL SYSTEM

BACKGROUND OF THE INVENTION

The complexity of installing and maintaining the warning and signalling lights of school buses and other vehicles poses technical problems for both vehicle manufacturers and operators. Typically, states require that school bus warning and signal illumination systems include:

1. A pair of alternately flashing amber warning lights at both front and rear to indicate vehicle slowdown to stop and pick up or discharge students.

2. A pair of alternately flashing red warning lights at both front and rear to indicate that the bus door is open (when students are entering or leaving the bus). Motorists must not pass the bus until the red lights are extinguished.

3. One or two white lights at the rear of the bus to indicate that it is in reverse and is backing up or is about to back up.

4. Two to four red brake lights at the rear of the bus.

5. At least two running lights at the rear of the bus, for night driving.

6. Right and left turn signal lamps on the rear of the bus.

Since all lights at the rear of the bus must be controlled from the front, installation and maintenance of the multiple wires to operate these lights pose serious problems, especially on the very large buses. Accordingly, it is the aim of this invention to provide a wiring system which simplifies the installation and maintenance of the lighting systems on school buses and other vehicles.

GENERAL DESCRIPTION OF THE INVENTION

The single wire light control system of the invention (FIG. 1) consists of two principal electronic units, a transmitter 30 located in the forward part of the bus and a receiver 40 in the rear. It is an important feature of the invention that the only wires required for operation of the rear lights are a single power lead and a single signal lead to the back of the bus. The transmitter operates on what in digital language is called a "parallel in" and "serial out" system. This means that bits of raw data, "on" or "off" commands for the rear lights, are collected simultaneously from the lighting controls such as the brake switch, reverse switch, warning light switch, etc. as indicated in FIG. 1, and are converted to a sequential or serial format for transmission on the single wire 44 to the rear of the bus. The receiver 40 is a "serial in" and "parallel out" system. The sequential pulse signal is decoded and the "on" or "off" command is directed to the proper lamps, brake lights, back up lights, warning lights, etc., as indicated in FIG. 1. The entire series of commands for the lights, and turn signals is transmitted over the connecting conductor 44 approximately two hundred times a second. Due to the speed at which the command data are upgraded when a switch is closed at the front of the bus, the response of the light at the rear is virtually instantaneous. Also, should a noise pulse or other spurious signal cause a "wrong" command to be transmitted, the "error" is corrected within one two hundredth of a second so that there is no perceptible flicker in the affected lamp. The series of commands may be transmitted at a frequency in the range of 100 to 500 sets of data bits per second.

The flasher 50 and function sequencer 54 for an eight light warning system is contained in the transmitter and the front red and amber warning lamps and the turn signal lamps are connected directly to it.

BRIEF DESCRIPTION OF THE DRAWINGS

The invention, including its features and advantages will be understood from a reading of the following specification considered in conjunction with the drawings in which.

DESCRIPTION OF PREFERRED EMBODIMENT

For purposes of disclosure, and not in any limiting sense, the circuits of the light control system of the invention, including the various components of the transmitter and of the receiver are described in detail in the paragraphs below.

TRANSMITTER COMPONENTS

Figure 1:
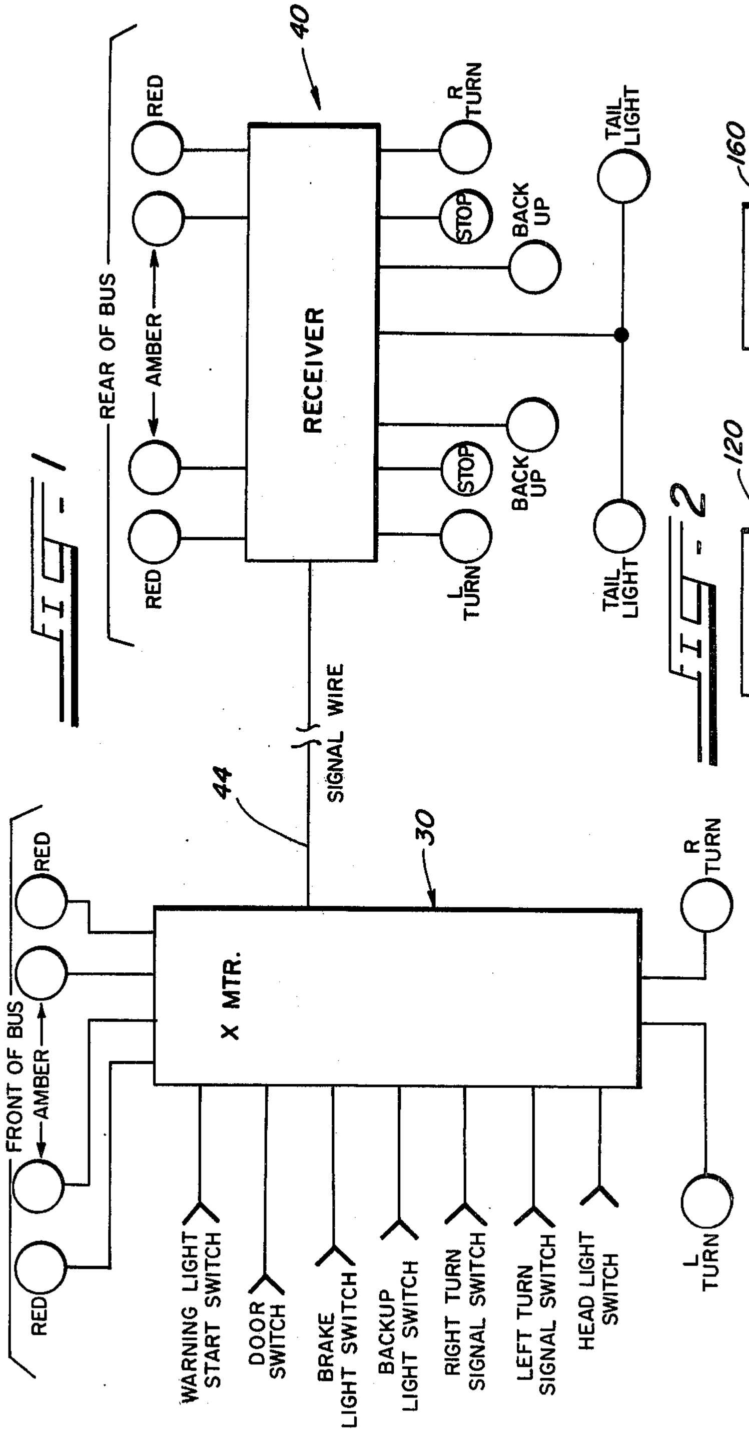
FIG. 1 is a block diagram of a complete warning and signal system according to the invention, as applied to a school bus.
Figure 2:
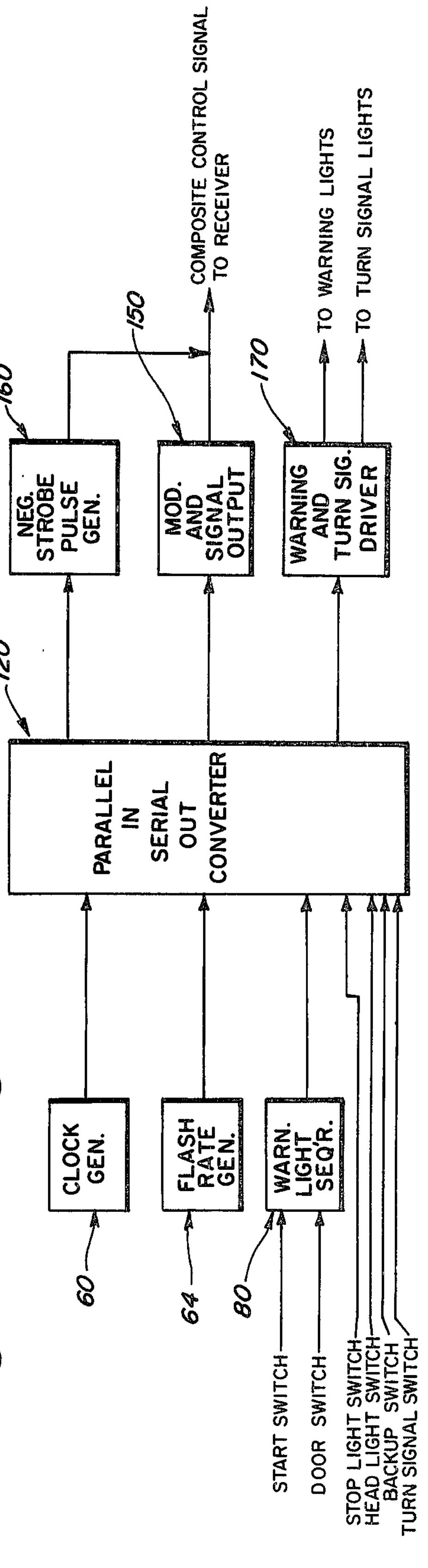
FIG. 2 is a block diagram of the transmitter section of the system.
Figures 3, 3A:
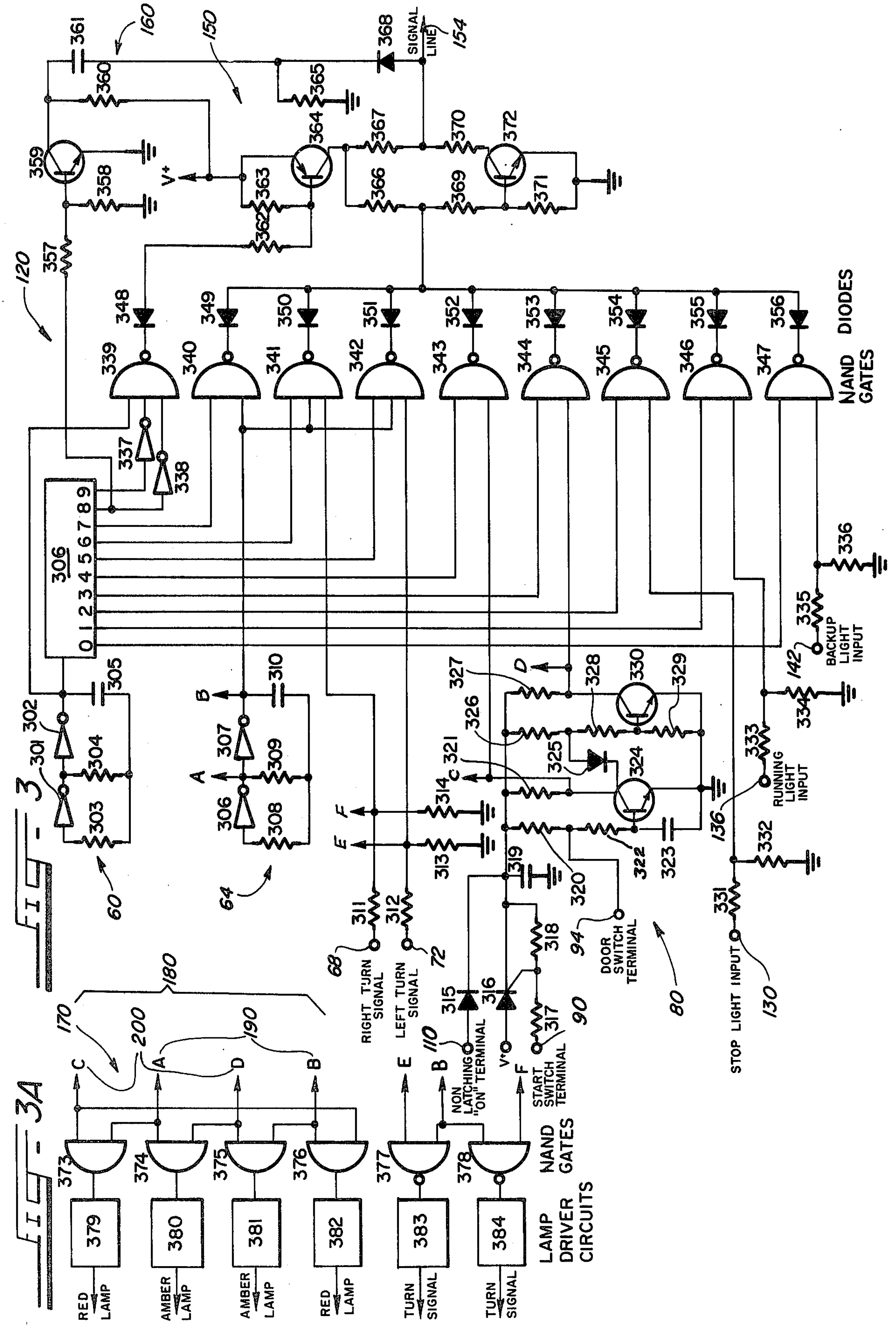
FIGS. 3 and 3A are schematic drawings of the transmitter section.

The transmitter 30 portion of the system can be divided into seven basic circuits as shown in FIG. 2. Referring to the block diagram (FIG. 2) and the schematic diagram (FIG. 3) the following description of each circuit, its components and their functions will ensure that the invention is fully understood.

Clock Generator

The clock generator 60 (FIG. 2) consists of (FIG. 3) IC inverters 301 and 302 resistors 303 and 304 and a capacitor 305. The components are connected to form an astable multivibrator, the values being selected to produce a square wave of approximately two thousand Hertz (FIG. 6A). The frequency was selected to produce the least radio interference and still maintain fast control response. The clock generator produces the basic signal that is converted into the serial control signal.

Flash Rate Generator

The flash rate generator 64 consists of (FIG. 3) IC inverters 306 and 307 resistors 308 and 309 and a capacitor 310. The circuit configuration is identical to that of the clock generator 60 except the component values are selected to produce a frequency of 2 Hertz. The function of the flash rate generator 64 is to provide the signal to alternately flash the warning lights at a rate of about sixty flashes per side per minute. The same signal is also used to flash the left turn signals, 68 and the right turn signals 72.

Warning Light Sequencer

The warning light sequencer 80 consists of (FIG. 3) diodes 315 and 325 resistors 317, 318, 320, 321, 322, 326, 327, 328 and 329 capacitors 319 and 323 silicon controlled rectifier 316 and transistors 324 and 330. The function of the circuit is to provide and hold an amber light "on" signal when a momentary voltage is applied to the "Start Terminal" 90. When the "Door Switch Terminal" 94 is connected to ground, the amber light "on" signal must go off and the red light "on" signal must hold until the "Door Switch Terminal" 94 is removed from ground, then both red and amber signals must turn off.

Due to the fact this system used digital technology and for the sake of simplicity, all outputs below 15% of supply voltage will be described as "0" and all outputs above 85% of supply voltage will be described as "1."

The anode of the silicon controlled rectifier 316 is a continuous "1" when the transmitter is in operation. When a momentary "1" is supplied to the gate through resistor 317 from start terminal 90, the cathode becomes a "1" and latches up. Transistor 324 is biased ON through resistors 320 and 322 and the collector current through resistor 321 produces a "0" at the collector and point C which is the red warning control line. With transistor 324 collector "0," diode 325 conducts through resistor 326 and due to the voltage divider formed by resistors 328 and 329, transistor 330 is OFF and with no current through resistor 327 the collector and point D, the amber control line are a "1." Holding current to keep silicon controlled rectifier 316 latched is through resistor 321 and transistor 324. When the "Door Switch Terminal" 94 is connected to ground bias current is removed from transistor 324 and this turns off the collector current. The collector and point C become a "1." Diode 325 is reversed biased and turns off leaving resistors 326 and 328 provide base current to turn on transistor 330 and the collector and point D become "0" by virtue of the collector current through resistor 327. Holding current to keep silicon controlled rectifier 316 latched is now through resistor 320 and the grounded "Door Switch Terminal" 94. When the "Door Switch Terminal" 94 is removed from ground capacitor 323 delays the turn on of transistor 324 and there is insufficient holding current for silicon controlled rectifier 316 and it turns off, points C and D become "0." A "1" provided to the "Nonlatching ON terminal" 110 will supply operating current to the warning light sequences circuit through diode 315 without turning on the silicon controlled rectifier 316. The desirability of this feature will be explained in this system operation.

Parallel to Serial Converter

Figure 6:
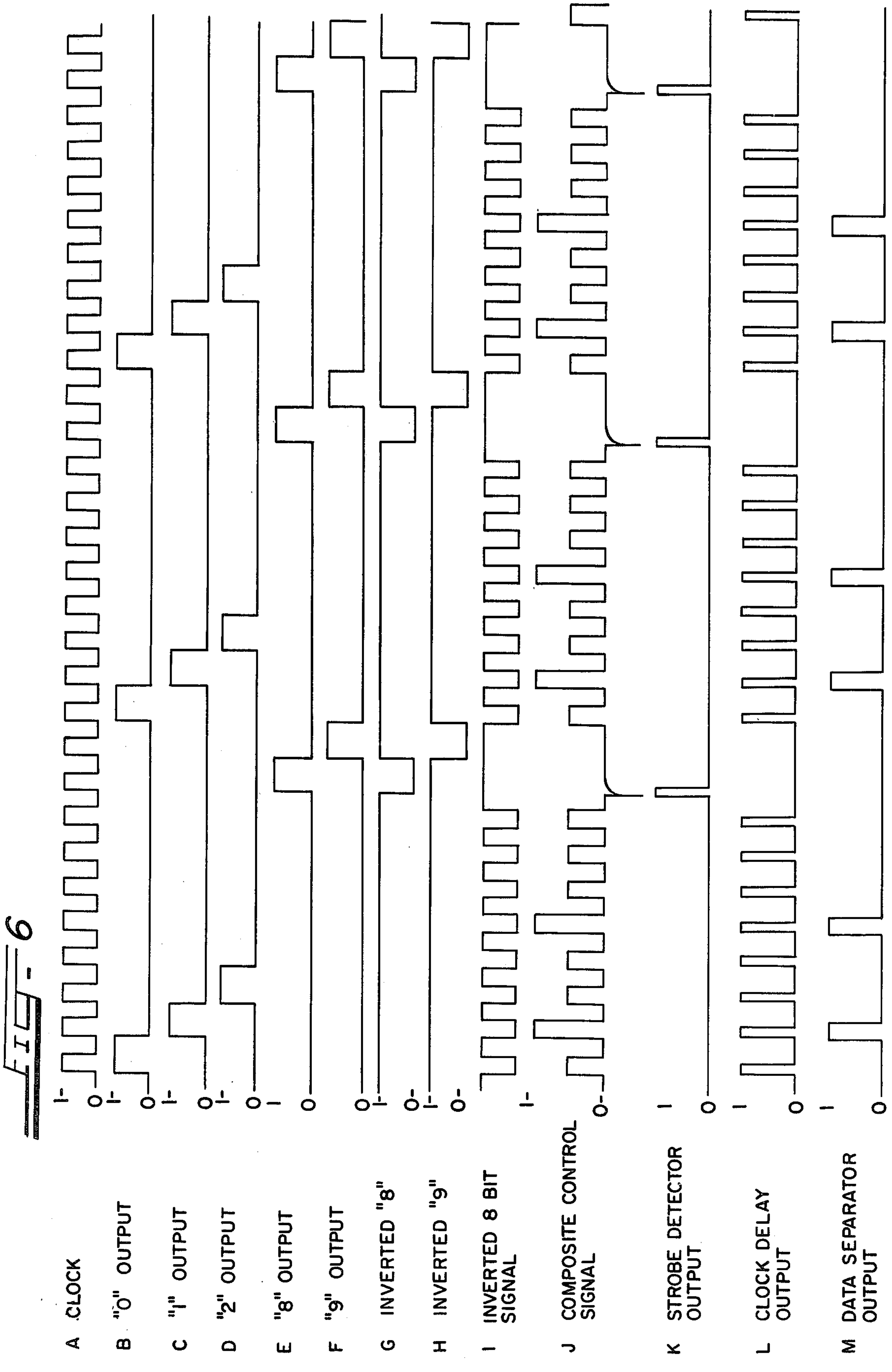
FIG. 6 is a timing drawing of significant waveforms in transmitter and receiver.

The parallel-in to serial-out converter 120 consists of components (FIG. 3) IC decade counter and divider 306 IC three input Nand gates 339, 341, 342 IC two input Nand gates 340, 343, 344, 345, 346, 347 IC inverters 337, 338 and diodes 348, 349, 350, 351, 351, 353, 354, 355, 356. Referring to FIG. 6, the outputs of the "Clock Generator" 60 (FIG. 6A) is fed into IC decade counter 306 and the timing diagrams (FIGS. 6B, 6C, 6D, 6E, and 6F) are representative of the ten outputs labeled "0" through "9." The "8" and "9" outputs are inverted by IC's 337 and 338, (FIGS. 6G and 6H) and feed along with the clock generator signal into IC three input NAND gate 339 to produce the inverted eight bit serial signal illustrated by FIG. 6I. Each of the remaining eight outputs of IC 306 sequentially becomes a "1," if the other input or inputs are also "1's", the output will become a "0" or negative data pulse. The second input of IC 345, to the stop-light terminal 130 is connected to resistors 331 and 332, which form a voltage divider to insure against excessive voltage at the input. The same holds true for IC 346 to the running light terminal 136 with resistors 333 and 334 and IC 347 to the back-up light terminal 142 with resistors 335 and 336. When voltage is applied to any of these inputs, a corresponding data pulse is produced. The second input of IC 340 is connected to the "Flash Rate Generator" 64 and produces a data pulse that corresponds to that output. The second inputs of IC 341 and 342 are connected to the "Flash Rate Generator" 64 and the third inputs are connected to input voltage divider resistors 311 and 314 for the flashing right turn data pulse 68 and resistors 312 and 313 for the flashing left turn data pulse 72. The second inputs of IC 343 and 344 are connected to the "Warning Light Sequencer" 80 to convert the red or amber "1" data to the appropriate data pulses. The output of each Nand gate is coupled to a common line in the Modulator 150 by a diode 349, 350, 351, 352, 353, 354, 355, 356. The output of IC 339, the "8" and "9" suppressor is also coupled through a diode 348.

Modulator and Signal Output

The modulator consists of components (FIG. 3) resistors 362, 363, 366, 367, 369, 370 and 371, and transistors 364 and 372. Transistor 372 a NPN and its collector load resistor 370 are connected in series with transistor 364 a PNP and its collector load resistor 367 from the supply voltage to ground. Resistors 367 and 370 are of equal resistance value. Transistor 372 is biased on by resistors 366, 369 and 371. Resistor 363 keeps transistor 364 turned off until the output of IC 339 goes to "0," then it is biased on through diode 348 and resistor 362 and the collector voltage rises to approximately supply voltage, at the same time transistor 372 is turned on and the supply voltage is divided between resistors 367 and 370 so that the "Signal Line" 154 voltage is approximately one half the supply voltage. The resulting output appearing at the "Signal Line" 154 will be identical to FIG. 6I except inverted and at one half the supply voltage. If any of the function IC's 349, 350, 351, 352, 353, 354, 355 or 356 are "0" transistor 372 is turned off and the corresponding output pulses will be almost full supply voltage in amplitude. An example is FIG. 6J where the second and fifth pulses are data pulses.

Negative Strobe Pulse Generator

The negative pulse generator 160 consists of components (FIG. 3) resistors 357, 358, 360 and 365 transistor 359 capacitor 361 and diode 368. The transistor 359 collector is connected to the supply voltage by resistor 360, and to the "Signal Line" 154 by capacitor 361 and diode 368 in series. Resistor 365 is connected from the anode of diode 368 to ground. At the instant the "8" output of IC 306 changes from "0" to "1" the voltage, coupled through bias resistors 357 and 358 turns transistor 359 on and the collector becomes a "0" discharging capacitor 361 through diode 368 to the "Signal Line" 154 creating a negative pulse. When the "8" output of IC 306 returns to "0" transistor 359 turns off and capacitor 361 is charged through resistors 360 and 365 to approximately supply voltage. The function of the negative pulse will be explained in the receiver operation.

Warning and Turn Signal Drivers

Due to the transmitters close procimity to the front lights, it is practical to include the Warning Light and Turn Signal 170 driving circuitry in the transmitter assembly and hard wire to the lamps. The required circuit components (FIG. 3) are IC And gates 373, 374, 375 and 376 IC Nand gates 377 and 378 and lamp driver circuits 379, 380, 381, 382, 383 and 384. Since only continuous "1" signals are available from the "Warning Light Sequencer" 180 to control the red and amber lamps, one two input And gate is required to drive each lamp, one input being connected to the "Flash Generator" 190 points (A) or (B) and the other to the "Sequencer" 200 points (C) or (D). Similarly the turn signals require additional circuitry to be driven direct. IC two input Nand gates 377 and 378 accomplish the turn signal function utilizing flash rate data from point (B) and directional data from points (E) and (F). Due to the relatively low power output of the IC's, the high current driving circuits 379, 380, 381, 382, 383 and 384 are required to power the lamps. FIG. 7 illustrates four possible lamp driver circuits for this application, FIG. 7A, a relay circuit and FIG. 7B a transistor circuit for "1" ON drivers and FIG. 7 C a relay circuit and FIG. 7D a transistor circuit for "0" ON drivers. The operation of these circuits is obvious to one schooled in electronics and should require no further explanation.

FIG. 6J is representative of the composite signal generated by the transmitter 30 and conveyed to the receiver 40 by the single wire. In this example, the second and fifth pulses are "1" data and the remainder are "0" data.

Receiver Components

Figure 4:
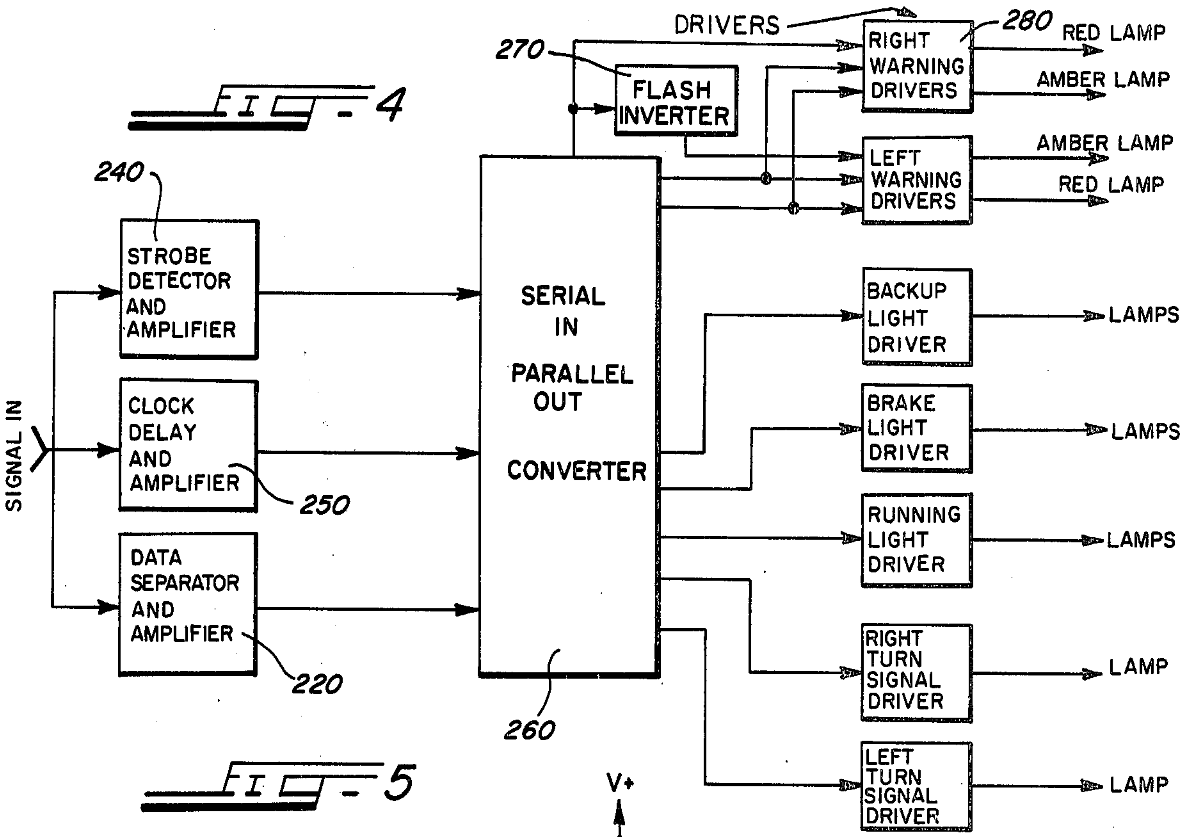
FIG. 4 is a block diagram of the receiver section.
Figure 5:
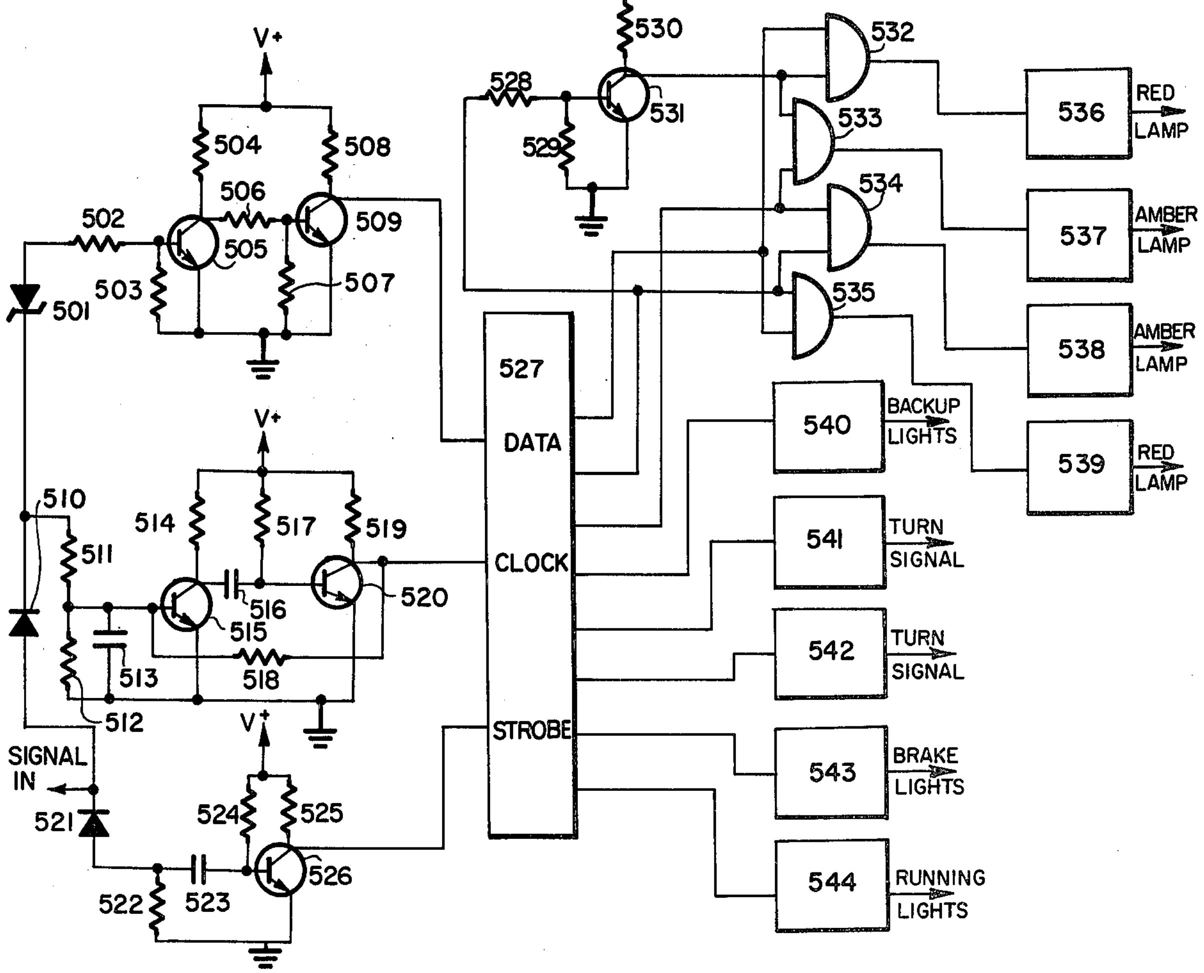
FIG. 5 is a schematic drawing of the receiver section.

The receiver portion 40 of the system can be divided into twelve basic circuits as shown in FIG. 4. Referring to the block diagram (FIG. 4) and the schematic diagram (FIG. 5), the following will be a description of each circuit, its components and their functions.

Data Separator and Amplifier

The data separator and amplifier 220 consists of a (FIG. 5) Zener diode 501 resistors 502, 503, 504, 506, 507 and 508 and transistors 555 and 509. The composite control signal (FIG. 6J) is supplied to the anode of the Zener diode 501 minus the negative pulse which is eliminated by the series diode 510. The Zener voltage of the Zener diode 501 is one half supply voltage. When the incoming signal pulses exceed one half the supply voltage (FIG. 6J second and fifth pulses), the Zener diode 501 conducts through bias resistors 502 and 503 and turns transistor 505 collector current on to produce a "0" for each incoming signal pulse that exceeds one half supply voltage. Resistors 507, 507 and 508 and transistor 509 are connected to produce an inverting amplifier which changes the "0" data pulses to "1" data pulses. The signal output at the collector of transistor 509 will be a "1" data pulse corresponding to each high amplitude pulse of the incoming line signal. Example is FIG. 6M. This is the method by which the "1" data pulses (full amplitude) are separated from the "0" data pulses (one half amplitude).

Strobe Detector and Amplifier

The strobe detector and amplifier 240 consists of (FIG. 5) resistors 522, 524 and 525 diode 521 capacitor 523 and transistor 526. The cathode of the diode 521 is connected to the signal line so that only the negative pulses of the composite control signal appear across the resistor 522. The transistor 526 is biased on by the base resistor 524 and the voltage drop across the collector resistor 525 creates a "0" output. Each negative pulse across the resistor 522 is coupled to the base of transistors 526 by the capacitor 528 and creates a positive pulse at the collector. The output of this circuit is a series of positive pulses (FIG. 6K) corresponding to the negative pulses of the composite control signal (FIG. 6J).

Clock Delay and Amplifier

The clock delay and amplifier 250 consists of components (FIG. 5) resistors 511, 512, 514, 517, 518 and 519 capacitors 513 and 516 and transistors 515 and 520. Transistor 520 is biased by resistor 517 to a normally saturated condition and the voltage drop across resistor 519 creates a "0" at the collector. The incoming composite control signal is coupled to the base of transistor 515 through the diode 510, which eliminates the negative pulse, to the voltage divider resistor 511 and 512. The rise of the voltage across the resistor 512 is slowed by the capacitor 513. When the voltage at the base of the transistor 515 is sufficient it turns on and the collector becomes a "0" due to the voltage drop across the resistor 514. With the collector of the transistor 515 a "0" the discharge of the capacitor 516 drives the transistor 520 out of saturation creating a positive pulse at the collector which has an on duration determinated by the values of the capacitor 516 and the resistor 517. The resistor 518 from the collector of the transistor 520 to the base of the transistor 515 forms a hysteresis loop to insure a positive toggle action. This circuit generates groups of eight pulses which coincide with the positive signal pulses except they are slightly delayed and of shorter duration. (FIG. 6L)

Serial in Parallel Out Converter

This circuit 260 consists of an IC 8 Stage Shift and Store Bus Register 527. (FIG. 5) This IC has three inputs, a "Clock" input, a "Data" input and a "Strobe" input and eight outputs. As each of the eight clock pulses from the clock generator is fed into the clock input, the "0" or "1" data from the data separator is shifted into the eight registers. At the end of each set of eight clock pulses, the data in the shift registers is transferred to the output registers and latched by the signal from the "Strobe Amplifier" 240 to the strobe input. The eight bits of data, "0" or "1" are held at the outputs until the next strobe pulse. The output data is upgraded with each subsequent set of clock and data pulses by the strobe pulse. By this means the receiver is kept synchronized with the transmitter and the data presented to the inputs of the transmitter correspond with the data at the outputs of the receiver.

Flash Inverter

The flash inverter circuit 270 (FIG. 5) consists of resistors 528, 529 and 530 and transistor 531. The components are connected to form a simple inverting D. C. amplifier. The right side red or amber warning lamps are controlled directly by the "ON" and "OFF" commands from the flasher and the left side by the inverted commands, thereby producing an alternating pattern.

Warning Light Drivers

Figure 7A:
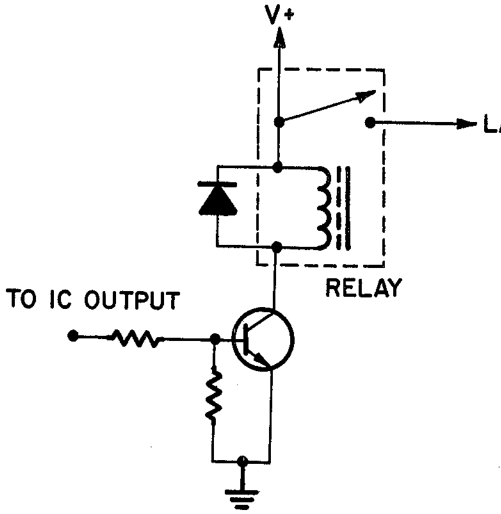
FIGS. 7A through 7D are schematics of lamp driver output circuits.
Figure 7C:
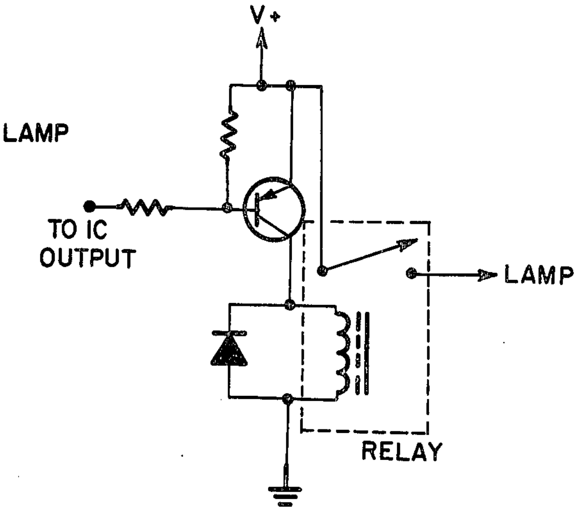
Figure 7B:
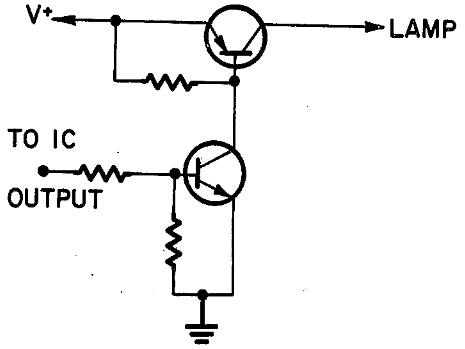
Figure 7D:
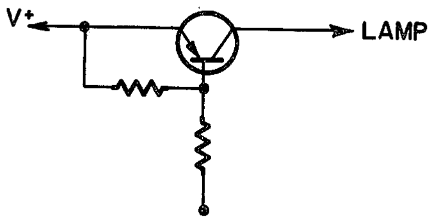

The warning light driver circuitry 280 (FIG. 5) consists of IC two input AND gates 532, 533, 534 and 535 and lamp driver circuits 536, 537, 538 and 539. Since three bits of data are used to operate the four warning lamps, the two input AND gates are required to interface between the input signals and lamp drivers. The "ON" and "OFF" data is a continuous function from the transmitter and is connected directly to one input of the two right side AND gates. The opposite phase data from the Flash Inverter 270 is connected to one input of the two left side AND gates. The red "ON" data is connected to the second input of the red lamp IC's and the amber "ON" data is connected to the second input of the amber lamp IC's. The outputs of the Warning Light IC's are connected to the lamp driver circuits 536, 537 and 538 and 539 which can be either relays (FIG. 7A) or transistorized (FIG. 7B).

Lamp Drivers

The remainder of the lights are controlled directly from the converter IC 527. The driver circuits (FIG. 5) for the backup lights 540 turn signals 541 and 542 brake lights 543 and running lights 544 can be either relay (FIG. 7A) or transistorized (FIG. 7B).

The single wire light control system as described is configured primarily to fullfill the requirements of the modern school bus lighting control. Inputs are provided for a momentary switch to start the amber warning lights with a door switch input for automatic change over to red when the door is opened. There is also a Non-Latching input provided for states that require an override or manual control by the driver. Inputs are provided for the single wire control of the other rear lights also.

With slight modification, this systen could be used for controlling a variety of other functions such as heater defroster fans, door solenoids, etc., on trucks, trailers and other vehicles. Additional bits of data can be added and more than one receiver can be used if required for widely separated locations.

While disclosures of preferred embodiments of the invention and preferred methods for fabricating the structural components of the invention have been provided, it will be apparent to those skilled in the art that numerous modifications, changes and variations can be made without departing from the essential spirit of the underlying principles of the invention. It is, therefore, desired by the following claims to include within the scope of the invention all such variations and modifications by which substantially the result of this invention may be obtained through the use of substantially the same or equivalent means.

What is claimed is:

1. In combination with a series of electrical devices and vehicle lights including a power line, warning lights and signal lights near the front and near the rear of a vehicle such as a bus, a single-control-wire digital system comprising electrical devices and lighting control means and transmitter means, and receiver means for generating combined data, clock, and synchronization signals in a single clock system and for responding thereto for controlling electrical devices and for illuminating warning and signal lights, said transmitter means including signal converter means for transforming parallel-in signals to serial-out signals at a first zone of said vehicle, and means for collecting command data simultaneously from a plurality of said lighting control means, and for converting said data to serial pulse signals, said receiver means including signal converter means for transforming serial-in signals to parallel-out signals at a second zone of said vehicle, and for decoding said serial pulse signals received, and responsive thereto for directing on and off command data to energize selectively specific ones of said electrical devices and lights as dictated solely by the time-position of said pulse signals from said transmitter means, and pulse conductor means interconnecting said transmitter means with said receiver means for conveying electrical signals therebetween.

2. The structure as set forth in claim 1 wherein commands derived from said command data from said lighting control means are transmitted as a series to said vehicle lights at a frequency in the range of from about 100 to 500 sets of data bits per second, to which said lights are functionally responsive.

3. The structure as set forth in claim 2 wherein commands derived from said command data from said lighting control means are transmitted as a series to said vehicle lights at a frequency of about 200 sets of data bits per second.

4. The structure as set forth in claim 1 wherein said serial-out signals at said first zone of said vehicle are a series of time-keyed partial amplitude and full amplitude pulses for directing on and off control data.

* * * * *